United States Patent
Abedini et al.

(10) Patent No.: US 10,869,322 B2
(45) Date of Patent: Dec. 15, 2020

(54) SUPPORTING LOW-LATENCY TRAFFIC OVER A WIRELESS MESH NETWORK

(71) Applicant: QUALCOMM Incorporated, San Diego, CA (US)

(72) Inventors: Navid Abedini, Somerset, NJ (US); Junyi Li, Chester, NJ (US); Karl Georg Hampel, Hoboken, NJ (US); Jianghong Luo, Skillman, NJ (US); Muhammad Nazmul Islam, Edison, NJ (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 16/119,919

(22) Filed: Aug. 31, 2018

(65) Prior Publication Data
US 2019/0075571 A1 Mar. 7, 2019

Related U.S. Application Data

(60) Provisional application No. 62/555,458, filed on Sep. 7, 2017.

(51) Int. Cl.
*H04W 72/10* (2009.01)
*H04W 72/12* (2009.01)
(Continued)

(52) U.S. Cl.
CPC .......... *H04W 72/10* (2013.01); *H04L 47/824* (2013.01); *H04W 72/085* (2013.01);
(Continued)

(58) Field of Classification Search
None
See application file for complete search history.

(56) References Cited

U.S. PATENT DOCUMENTS

| 2014/0376427 A1* | 12/2014 | Hui | ............... H04L 5/16 370/296 |
| 2015/0333898 A1 | 11/2015 | Ji et al. | |

(Continued)

OTHER PUBLICATIONS

International Search Report and Written Opinion—PCT/US2018/049384—ISA/EPO—dated Nov. 23, 2018.
(Continued)

*Primary Examiner* — Saumit Shah
(74) *Attorney, Agent, or Firm* — Holland & Hart LLP

(57) ABSTRACT

Methods, systems, and devices for wireless communications are described. A central access node (CAN) may manage and schedule resources for a wireless mesh network. The CAN may transmit a first message to a relay access node (AN) to expedite transmission of a priority communication in the wireless mesh network. The first message may provide configuration information for modifying a preconfigured schedule to expedite the transmission of the priority communication. For example, the first message may provide configuration information to modify a preconfigured schedule to allow a first network node to transmit the priority communication to a second network node during a reserved time period. The relay AN may generate a second message regarding the modified schedule and transmit the second message to the second network node.

30 Claims, 11 Drawing Sheets

(51) Int. Cl.
*H04W 72/08* (2009.01)
*H04L 12/911* (2013.01)
*H04W 84/18* (2009.01)
*H04W 72/04* (2009.01)

(52) U.S. Cl.
CPC ........ *H04W 72/12* (2013.01); *H04W 72/0406* (2013.01); *H04W 84/18* (2013.01)

(56) References Cited

U.S. PATENT DOCUMENTS

| | | | |
|---|---|---|---|
| 2016/0029403 A1* | 1/2016 | Roy | H04W 72/0406 370/336 |
| 2017/0064724 A1 | 3/2017 | Wang et al. | |
| 2017/0150481 A1 | 5/2017 | Gupta et al. | |

OTHER PUBLICATIONS

Qualcomm Incorporated: "Sidelink Design for NR", 3GPP Draft; R1-167310_SIDELINK_DESIGN, 3rd Generation Partnership Project (3GPP), Mobile Competence Centre ; 650, Route Des Lucioles; F-06921 Sophia-Antipolis Cedex ; France vol. RAN WG1, No. Gothenburg, Sweden; 20160822-20160826 Aug. 13, 2016, XP051133009, Retrieved from the Internet: URL:http://www.3gpp.org/ftp/tsg_ran/WG1_RL1/TSGR1_86/Docs/ [retrieved on Aug. 13, 2016], 4 pages.

* cited by examiner

SUPPORTING LOW-LATENCY TRAFFIC OVER A WIRELESS MESH NETWORK

CROSS REFERENCES

The present application for patent claims the benefit of U.S. Provisional Patent Application No. 62/555,458 by Abedini et al., entitled "Supporting Low-Latency Traffic Over a Wireless Mesh Network," filed Sep. 7, 2017, assigned to the assignee hereof, and expressly incorporated by reference in its entirety.

BACKGROUND

The following relates generally to wireless communication, and more specifically to supporting low-latency traffic over a wireless mesh network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (OFDM) (DFT-S-OFDM). A wireless multiple-access communications system may include a number of base stations or network access nodes (ANs), each simultaneously supporting communication for multiple communication devices, which may be otherwise known as user equipment (UE).

A wireless communications system may be a wireless mesh network including a plurality of network nodes. Network nodes in a wireless mesh network may act as UEs or may act as ANs for other network nodes acting as UEs. Thus, a network node in a wireless mesh network may be capable of acting as an AN in one time instance and as a UE in another time instance. Additionally, each network node may be configured to transmit in a directional manner (e.g., using beamforming techniques). Beamforming techniques may allow a network node to improve signal quality by avoiding or minimizing interference from transmissions originating from directions other than the direction in which the network node is oriented.

SUMMARY

The described techniques relate to improved methods, systems, devices, or apparatuses that support low-latency traffic over a wireless mesh network. Generally, the described techniques provide for receiving a first message at a relay network node in a wireless mesh network. The first message may concern a priority communication such as an ultra-reliable low latency communication (URLLC) that may be transmitted from a first network node to a second network node. The first message may be transmitted by a central node that manages and schedules resources in the network in order to modify a preconfigured schedule. Upon receipt of the first message, the relay network node may transmit a second message based at least in part on the first message. The second message may be transmitted to the second network node and may provide information to expedite the transmission of the priority communication through the wireless mesh network (including from the first network node to the second network node).

A method of wireless communication is described. The method may include receiving, at a wireless device in a wireless mesh network, a first message concerning a priority communication that is to be transmitted from a first network node to a second network node and transmitting, based at least in part on receipt of the first message, a second message to the second network node, the second message including information to facilitate receipt of the priority communication by the second network node.

An apparatus for wireless communication is described. The apparatus may include means for receiving, at a wireless device in a wireless mesh network, a first message concerning a priority communication that is to be transmitted from a first network node to a second network node and means for transmitting, based at least in part on receipt of the first message, a second message to the second network node, the second message including information to facilitate receipt of the priority communication by the second network node.

Another apparatus for wireless communication is described. The apparatus may include a processor, memory in electronic communication with the processor, and instructions stored in the memory. The instructions may be operable to cause the processor to receive, at a wireless device in a wireless mesh network, a first message concerning a priority communication that is to be transmitted from a first network node to a second network node and transmit, based at least in part on receipt of the first message, a second message to the second network node, the second message including information to facilitate receipt of the priority communication by the second network node.

A non-transitory computer readable medium for wireless communication is described. The non-transitory computer-readable medium may include instructions operable to cause a processor to receive, at a wireless device in a wireless mesh network, a first message concerning a priority communication that is to be transmitted from a first network node to a second network node and transmit, based at least in part on receipt of the first message, a second message to the second network node, the second message including information to facilitate receipt of the priority communication by the second network node.

Some examples of the method, apparatus, and non-transitory computer-readable medium described above may further include processes, features, means, or instructions for generating the second message to indicate that the priority communication may be to be received by the second network node from the first network node during a transmission time interval reserved for communications between nodes other than the first network node and the second network node.

Some examples of the method, apparatus, and non-transitory computer-readable medium described above may further include processes, features, means, or instructions for generating the second message to explicitly indicate to the second network node instructions to alter a scheduling of other communications affected by the priority communication.

In some examples of the method, apparatus, and non-transitory computer-readable medium described above, receiving the first message comprises: receiving the first message from a central node which manages or schedules resources in the wireless mesh network.

In some examples of the method, apparatus, and non-transitory computer-readable medium described above, the first message may be received from the central node over multiple hops.

In some examples of the method, apparatus, and non-transitory computer-readable medium described above, the first message may be received directly from the central node.

In some examples of the method, apparatus, and non-transitory computer-readable medium described above, the priority communication may be low latency traffic.

Some examples of the method, apparatus, and non-transitory computer-readable medium described above may further include processes, features, means, or instructions for generating the second message to indicate that the priority communication may be to be received by the second network node from the first network node during a transmission time interval reserved for communications between nodes other than the first network node and the second network node.

Some examples of the method, apparatus, and non-transitory computer-readable medium described above may further include processes, features, means, or instructions for generating the second message to indicate at least one of resource information or configuration information to be used by the second network node in receipt of the priority communication.

In some examples of the method, apparatus, and non-transitory computer-readable medium described above, the second message comprises at least one of a modulation and coding scheme for the priority communication, a numerology for the priority communication, a reference signal pattern for the priority communication, a number of transmission layers for the priority communication, hybrid automatic repeat request-related information for the priority communication, a number of antenna ports for the priority communication, precoding information for the priority communication, beamforming information for the priority communication, or quasi-co-location information for the priority communication.

In some examples of the method, apparatus, and non-transitory computer-readable medium described above, transmitting the second message comprises: transmitting the second message over a control channel, a data channel, or both.

Some examples of the method, apparatus, and non-transitory computer-readable medium described above may further include processes, features, means, or instructions for generating the second message to explicitly indicate to the second network node instructions to alter a scheduling of other communications affected by the priority communication.

Some examples of the method, apparatus, and non-transitory computer-readable medium described above may further include processes, features, means, or instructions for generating the second message to indicate an action for the second network node to take after receipt of the priority communication.

In some examples of the method, apparatus, and non-transitory computer-readable medium described above, the action comprises forwarding data included in the priority communication to a third network node.

In some examples of the method, apparatus, and non-transitory computer-readable medium described above, the second message comprises an indication of at least one of resource information or configuration information for the forwarding of data included in the priority communication.

A method of wireless communication is described. The method may include receiving, at a wireless device in a wireless mesh network, a first message concerning a priority communication that is to be transmitted from a first network node to a second network node and transmitting, based at least in part on receipt of the first message, a second message to a third network node, the second message indicating that the third network node is to modify a preconfigured ongoing schedule of communications between neighboring network nodes as a result of the priority communication.

An apparatus for wireless communication is described. The apparatus may include means for receiving, at a wireless device in a wireless mesh network, a first message concerning a priority communication that is to be transmitted from a first network node to a second network node and means for transmitting, based at least in part on receipt of the first message, a second message to a third network node, the second message indicating that the third network node is to modify a preconfigured ongoing schedule of communications between neighboring network nodes as a result of the priority communication.

Another apparatus for wireless communication is described. The apparatus may include a processor, memory in electronic communication with the processor, and instructions stored in the memory. The instructions may be operable to cause the processor to receive, at a wireless device in a wireless mesh network, a first message concerning a priority communication that is to be transmitted from a first network node to a second network node and transmit, based at least in part on receipt of the first message, a second message to a third network node, the second message indicating that the third network node is to modify a preconfigured ongoing schedule of communications between neighboring network nodes as a result of the priority communication.

A non-transitory computer readable medium for wireless communication is described. The non-transitory computer-readable medium may include instructions operable to cause a processor to receive, at a wireless device in a wireless mesh network, a first message concerning a priority communication that is to be transmitted from a first network node to a second network node and transmit, based at least in part on receipt of the first message, a second message to a third network node, the second message indicating that the third network node is to modify a preconfigured ongoing schedule of communications between neighboring network nodes as a result of the priority communication.

Some examples of the method, apparatus, and non-transitory computer-readable medium described above may further include processes, features, means, or instructions for generating the second message to explicitly indicate modifications of the preconfigured ongoing schedule to be made by the third network node.

In some examples of the method, apparatus, and non-transitory computer-readable medium described above, the modifications include re-scheduling a previously scheduled transmission. In some examples of the method, apparatus, and non-transitory computer-readable medium described above, the modifications include dropping a previously scheduled transmission.

In some examples of the method, apparatus, and non-transitory computer-readable medium described above, receiving the first message comprises: receiving the first message from a central node which manages or schedules resources in the wireless mesh network.

In some examples of the method, apparatus, and non-transitory computer-readable medium described above, the first message may be received from the central node over multiple hops.

In some examples of the method, apparatus, and non-transitory computer-readable medium described above, the first message may be received directly from the central node.

In some examples of the method, apparatus, and non-transitory computer-readable medium described above, the third network node may be one of the first network node and the second network node.

DETAILED DESCRIPTION

Figure 1:
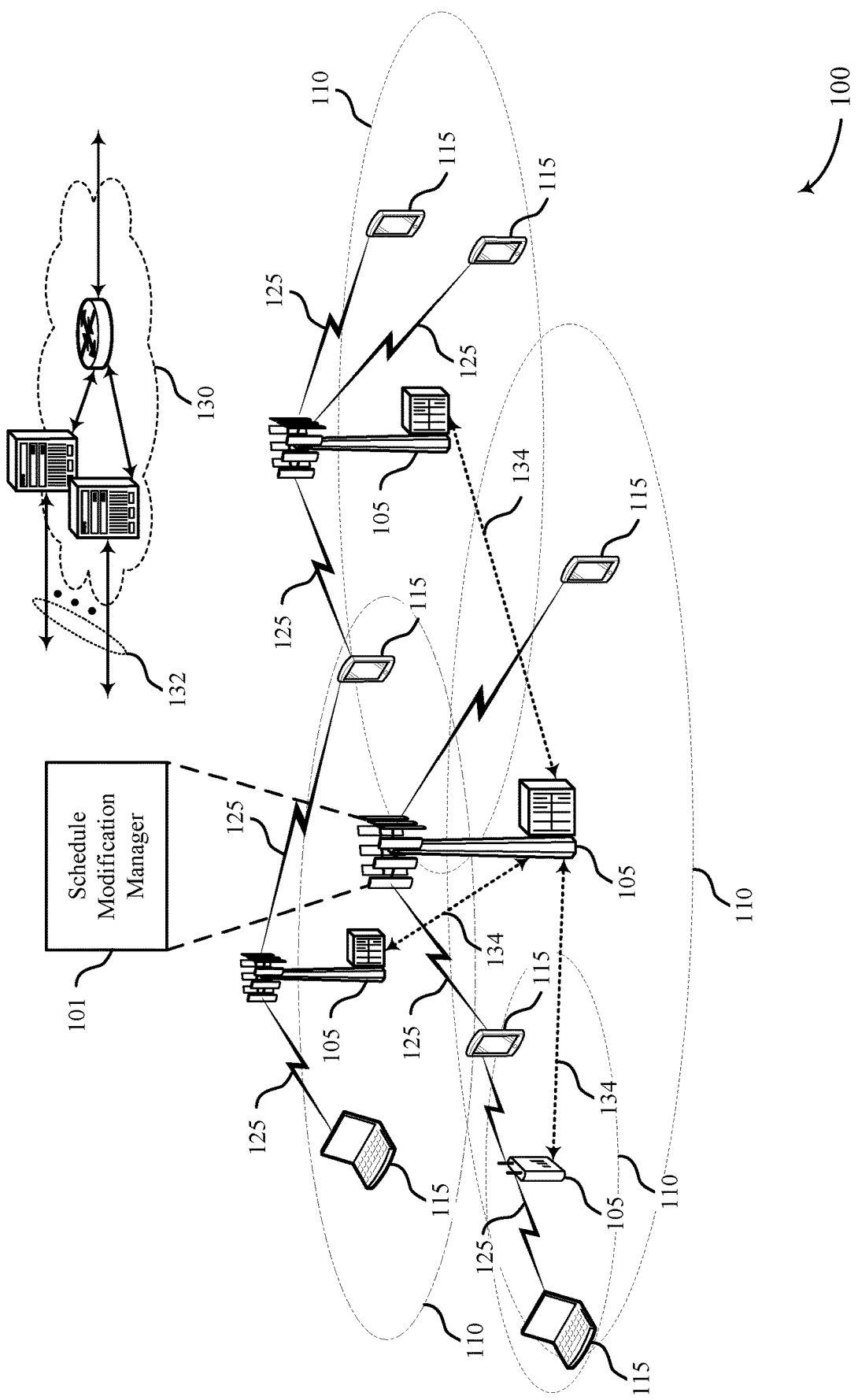
FIGS. 1 through 3 illustrate examples of wireless communications systems in accordance with aspects of the present disclosure.

A wireless communications system may be a wireless mesh network including a plurality of network nodes. In some instances, a network node may act as a user equipment (UE) in relation to other network nodes. In other instances, a network node may act as an access node (AN) for one or more neighboring network nodes that are acting in a UE capacity. Thus, network nodes in a mesh network may alternately act as a UE or an AN.

The network nodes of a wireless mesh network may transmit and receive in accordance with a preconfigured schedule. In some cases, the schedule may designate specific transmission time intervals for transmissions on specific links between network nodes. The schedule may indicate a time, a node, and/or a direction that communications may be expected. The preconfigured schedule may be of particular importance when the network nodes are using beamforming for their communications. While beamforming may direct a communication in a specific direction and may thus overcome interference that might occur without beamforming, beamformed communications do require that both a transmitting node and a receiving node are in beam alignment. If a network node is oriented in a direction that is different from where a communication is expected, the network node may miss receipt of the communication. Therefore, having a preconfigured schedule to assist network nodes in anticipating from which nodes or directions to expect communications at specific times can be beneficial.

In some instances, a central AN (CAN) may manage and schedule transmissions in the wireless mesh network using, for example, a preconfigured schedule which may be distributed to the networks nodes periodically. The use of a preconfigured schedule may increase the chances that transmissions will be received by their intended recipients by ensuring the network nodes are oriented in the right direction to receive transmissions according to the schedule.

However, the use of a preconfigured schedule may complicate the transmission of priority communications (e.g., communications that have low latency requirements such as ultra-reliable low latency communication (URLLC)). In particular, communications may be transmitted in accordance with the preconfigured schedule, because otherwise a communication may not be received by the intended recipient due to the orientation of the intended recipient. Transmitting the communication in accordance with the preconfigured schedule, however, may cause delays that fail to satisfy the latency requirements of a priority communication.

In order to expedite the transmission of a priority communication through a wireless mesh network, a CAN may generate and transmit a first message including configuration information for a priority communication between a first network node and a second network node. The content of the first message may be transmitted to the second node via one or more relay nodes. In essence, each relay node may receive the first message and generate a second message based at least in part on the first message. The second message may include any of the information in the first message. The second network node may modify the preconfigured schedule based at least in part on the second message. For example, the second network node may re-orient itself in the direction of the first network node so that it may receive the priority communication counter to a preconfigured schedule. The second network node may also forward the priority communication to a destination node (via one or more relay nodes) based at least in part on the second message. The nodes of the wireless mesh network may thereafter resume transmitting in accordance with the preconfigured schedule. In this manner, the wireless mesh network using a preconfigured schedule may accommodate priority communications.

Aspects of the disclosure are initially described in the context of a wireless communications system. Aspects of the disclosure are further illustrated by and described with reference to apparatus diagrams, system diagrams, and flowcharts that relate to supporting low-latency traffic over a wireless mesh network.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, backhaul links 134 may be wireless beamformed link, as explained in greater detail in relation to FIG. 2.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an AN controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, may be used as a signal processing technique at a transmitting device or a receiving device (e.g., a base station 105 or a UE 115). In some examples, beamforming may shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions. UE 115 may report, to the base station 105, an indication of the received signal with a highest signal quality or an otherwise acceptable signal quality. Although these techniques are described with reference to signals transmitted in one or more directions by a base station 105, a UE 115 may employ similar techniques. That is, a UE 115 may transmit multiple signals in different directions (e.g., for identifying a beam direction for subsequent transmission or reception by the UE 115), or may transmit a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may adjust a receiving direction to try multiple receive directions by receiving via different antenna subarrays, processing received signals according to different antenna subarrays, receiving according to different receive beamforming weight sets applied to signals received at a plurality of antenna elements of an antenna array, or processing received signals according to different receive beamforming weight sets applied to signals received at a plurality of antenna elements of an antenna array. In some examples, a receiving device trying multiple receive directions may be referred to as "listening" according to different receive beams or receive directions. In some examples a receiving device may use a single receive beam to receive along a single beam direction (e.g., when receiving a data signal). The receiving device may utilize the single receive beam with a direction determined based at least in part on listening according to different receive beam directions (e.g., a receiving device may use a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some instances, the base stations 105 and UEs 115 of wireless communications system 100 may act as a wireless mesh network. In such instances, the base stations 105 may wirelessly communicate with each other, and fewer than all of the base stations 105 may have direct communication with the core network 130. As explained in greater detail below, nodes in the wireless mesh network may communicate with each other in accordance with a preconfigured schedule. However, the preconfigured schedule may not be suitable for URLLC transmissions (e.g., may not facilitate transmissions within timeframes that satisfy the low-latency requirements of a URLLC transmission).

Therefore, one or more of the base stations 105 may include a schedule modification manager 101, which may include functionality for modifying a preconfigured schedule. The schedule modification manager 101 may be configured to receive a first message including configuration information for a priority communication between a first network node and a second network node. The priority communication may include a URLLC. The configuration information may include information for modifying a preconfigured schedule to expedite transmission of the priority communication. For example, the configuration information may include configuration information to modify the preconfigured schedule thus expediting a forwarding of the priority communication by the second network node. The configuration information for the priority communication may include, for example, a modulation and coding scheme for the priority communication, a reference signal pattern for the priority communication, a number of transmission layers for the priority communication, HARQ-related information for the priority communication, a number of antenna ports for the priority communication, information about a choice of precoding for the priority communication, digital and/or analog beamforming information for the priority communication, quasi co-location (QCL) information for the priority communication, or a combination thereof.

In some examples, the schedule modification manager 101 may determine that the first message relates to a priority communication intended for another base station 105.

The schedule modification manager 101 may generate a second message based at least in part on the first message. The second message may include any of the information provided in the first message. The base station 105 may transmit the second message to another node of the network. In some examples, the other node may be another relay node. In some other examples, the other node may be the second network node.

In some examples, the schedule modification manager 101 may determine that the first message relates to a priority communication intended for the base station 105 that includes the schedule modification manager 101. The schedule modification manager 101 may modify a preconfigured schedule based at least in part on receiving the first message. The modification to the preconfigured schedule may allow the base station 105 to receive the priority communication from the first network node during a time period in which the priority communication may not have been received according to the unmodified preconfigured schedule. The schedule modification manager 101 may modify the preconfigured schedule to expedite the forwarding of the priority communication to the destination node (either directly or through one or more relay nodes).

In some examples, UEs 115 that include D2D functionality may likewise include the functionality of schedule modification manager 101.

Figure 2:
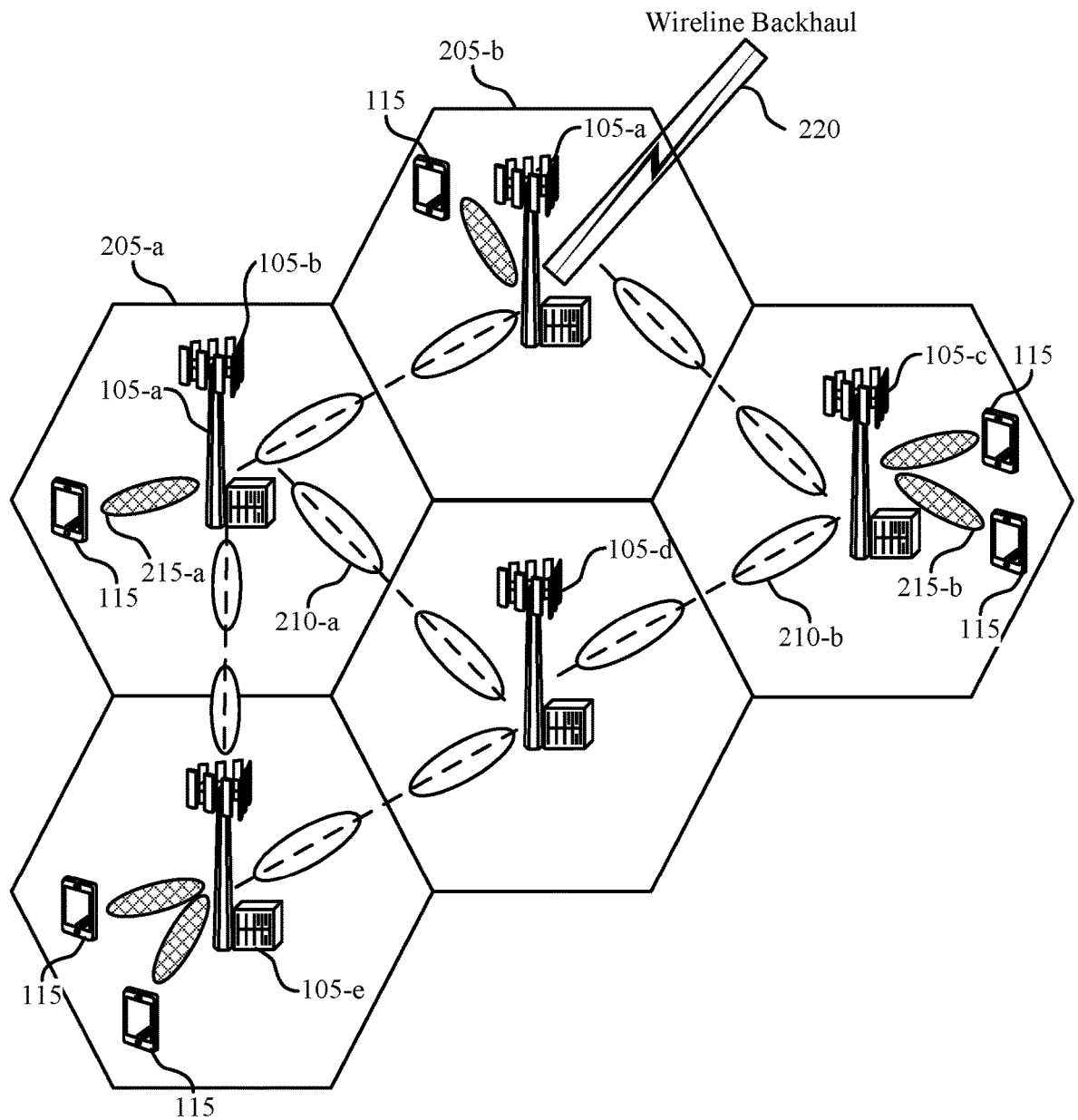

FIG. 2 illustrates an example of a wireless communications system 200 in accordance with various aspects of the present disclosure. In some examples, wireless communications system 200 may implement aspects of wireless communications system 100.

Wireless communications system 200 may include a number of base stations 105 and UEs 115. The base stations 105 may be configured so as to form a plurality of mesh networks 205, and the base stations 105 may communicate with other base stations 105 via wireless links 210. The base stations may also communicate with UEs 115 via direct wireless links 215. Wireless communications system 200 may include wireline backhaul link 220 connected to a subset of the base stations 105. For example, base station 105-a may be connected to backhaul link 220 while base stations 105-b, 105-c, 105-d, and 105-e may not be physically connected to backhaul link 220. Wireline backhaul link 220 may be a high capacity fiber backhaul connection to a core network.

Wireless links 210, 215 may be directional communications (e.g., mmW transmissions). Wireless communications system 200 may use directional transmissions to support, for example, access traffic between a base station 105 and a UE 115 as well as backhaul traffic between base stations 105. Wireless communications system 200 may be a relatively dense deployments of base stations 105 and may provide a subset of the base stations—in this example, only base station 105-a—with a wireline backhaul link 220, and other base stations 105 may rely on wireless links 210 for backhaul functionalities, a configuration which may be referred to as self-backhauling or integrated access/backhaul (IAB). Self-backhauling or IAB may share wireless resources between access traffic and backhaul traffic, and may enhance wireless link capacity, reduce latency, reduce the cost of cell deployment, or a combination thereof. In systems with mmW base station deployments, IAB may use relatively narrow beams for wireless backhaul links between base stations. These beams, which may be referred to as pencil beams, may reduce inter-link interference with one or more other directional communications links in the system.

In a wireless communications system 200, a base station 105 (e.g., base station 105-d) may be a CAN and may manage and schedule resources for transmissions. In this example, base station 105-d may be a CAN and may provide a preconfigured schedule to the other base stations 105 in the wireless communications system 200. In some examples, a priority communication (e.g., a URLLC) may be introduced into the wireless communications system 200. The CAN, base station 105-d, may transmit configuration information to modify the preconfigured schedule in order to expedite transmission of the priority communication through the wireless communications system 200.

One or more relay nodes (e.g., a base station 105) may receive a first message with the configuration information for modifying the preconfigured schedule to allow a priority communication between a first network node (e.g., a base station 105) and a second network node (e.g., a base station 105). The relay nodes may generate a second message based at least in part on the first message. At least one of the relay nodes may transmit the second message to the second network node. The second network node may modify the preconfigured schedule based at least in part on the second message such that the second network node may receive the transmission during a time period reserved for other transmissions in the unmodified preconfigured schedule. The second network node may also forward the priority communication to another network node such as a destination node (e.g., UE 115) based at least in part on the second message.

Figure 3:
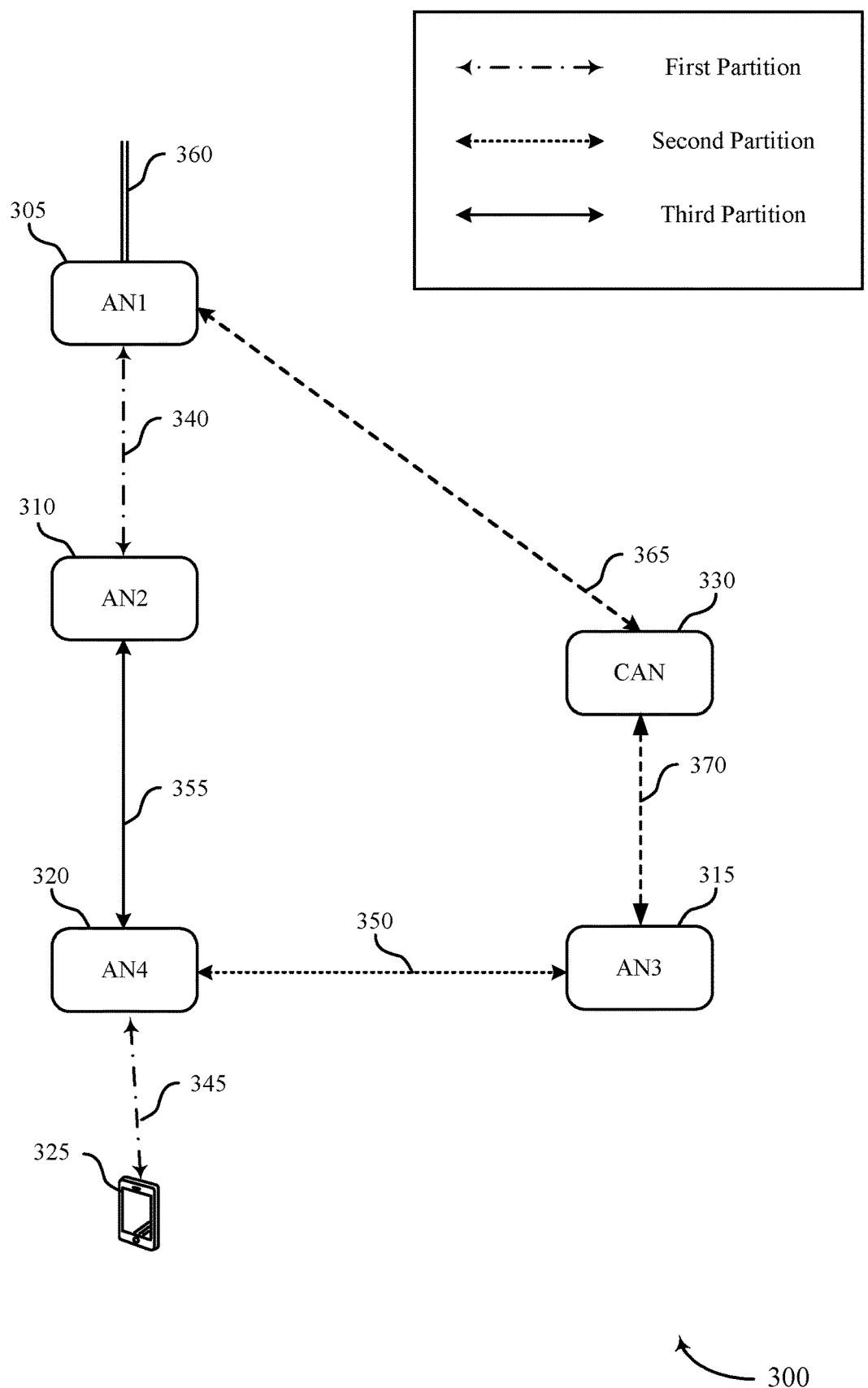

FIG. 3 illustrates an example of a wireless communications system 300 in accordance with various aspects of the present disclosure. In some examples, the wireless communications system 300 may implement aspects of wireless communications systems 100 or 200. In particular, wireless communications system 300 may include various ANs and UEs that represent network nodes within a wireless mesh network.

The wireless communications system 300 may include a first AN (AN1) 305, a second AN (AN2) 310, a third AN (AN3) 315, and a fourth AN (AN4) 320. In some examples, the ANs may include aspects of base stations 105 as described with reference to FIGS. 1 and 2. In some examples, one or more of the ANs may include aspects of UEs 115 having D2D capability, as described with reference to FIGS. 1 and 2. The wireless communications system 300 may also include a UE 325, which may include aspects of UEs 115 as described with reference to FIGS. 1 and 2. The UE 325 may include D2D functionality and may use the D2D functionality to communicate with AN4 320 when AN4 is a UE.

Communications within the wireless communications system 300 may be managed and scheduled by a CAN such as CAN 325, which may be include aspects of base stations 105 or UEs 115 as described with reference to FIGS. 1 and 2. The CAN 325 may partition the communication links in the wireless communications system 300 into two or more partitions for scheduling communications. For example, the CAN 325 may partition the communication links into three partitions. The communication link 340 between AN1 305 and AN2 310 and the communication link 345 between AN4 320 and UE 325 may be assigned to a first partition. The communication link 350 between AN3 315 and AN4 320 may be assigned to a second partition. The communication link 355 between AN2 and AN4 355 may be assigned to a third partition. The CAN 325 may then schedule communications in the wireless communications system 300 such that communications involving a particular partition will occur in a same time period. The CAN 325 may preconfigure the resource allocation and scheduling scheme and distribute the resource allocation and scheduling scheme to the ANs in the wireless communications system 300.

In some examples, a priority communication may be introduced into the wireless communications system 300. For example, a priority communication may be received by AN1 305 directly or indirectly via a wireline backhaul 360. Wireline backhaul 360 may include aspects of wireline backhaul 220 as described with reference to FIG. 2. In some examples, the priority communication may be received indirectly from the wireline backhaul 360 via one or more relay nodes.

A priority communication may be a delay-sensitive communication (e.g., low-latency traffic). For example, the priority communication may be a URLLC. In some examples, delivery of the priority communication using the preconfigured schedule may not be possible within the latency requirements of the priority communication. For example, in order to be delivered to the UE 325, the priority communication may be transmitted from AN1 305 to AN2 310 over communication link 340 during a first time period. The priority communication may then wait during the second period because the communication link 355 may not be part of the second partition. The priority communication may be transmitted from AN2 310 to AN4 320 over the communication link 355 during the third time period, and may be transmitted from AN4 320 to UE 325 in a fourth time period. However, if the latency requirements indicate that the priority communication must be delivered within three time periods, the preconfigured schedule may not be sufficient. In some cases, a different partition assignment or additional hops between AN1 305 and UE 325 may cause even greater delays.

In order to expedite transmission of priority communications, CAN 330 may provide instructions to the ANs in the wireless communications system 300 to transmit such priority communications without regard to the preconfigured schedule. For example, CAN 330 may receive an indication that a priority communication intended for UE 325 has been received by AN1 305. In some examples, the CAN 330 may receive the indication from AN1 305 over communication link 365, which for the purposes of this example is not assigned to any of the partitions. The communication link 365 may include one or more relay nodes. In some other examples, the CAN 330 may receive the indication from an upstream of AN1 305 (e.g., a relay node between AN1 305 and the wireline backhaul 360).

The CAN 330 may transmit a first message to AN3 315 over communication link 370. For the purposes of this example, the communication link 370 is not assigned to any of the partitions and may include one or more relay nodes. The first message may relate to transmission of the priority communication between AN2 310 and AN4 320 which may otherwise be delayed according to the preconfigured schedule. The first message may include configuration information for transmission of the priority communication between AN2 310 and AN4 320. The configuration information may include, for example, a modulation and coding scheme for the priority communication, a reference signal pattern for the priority communication, a number of transmission layers for the priority communication, HARQ-related information for the priority communication, a number of antenna ports for the priority communication, information about a choice of precoding for the priority communication, digital and/or analog beamforming information for the priority communication, QCL information for the priority communication, or a combination thereof.

The first message may also provide configuration information for additional transmissions involving the priority communication (e.g., configuration information for transmission of the priority communication from AN4 320 to UE 325). The first message may also provide information regarding how to modify the preconfigured schedule in a future time interval. For example, the first message may indicate for a future transmission scheduled within the preconfigured schedule to be re-scheduled. Additionally or alternatively, the first message may indicate for a transmission previously scheduled within the preconfigured schedule to be dropped.

AN3 315 may generate a second message based at least in part on the first message. The second message may include the configuration information for transmission of the priority communication between AN2 310 and AN4 320, as well as any other information provided by the CAN 330. AN3 315 may transmit the second message to AN4 320 on a control channel, a data channel, or a combination thereof. For example, AN3 315 may transmit the second message to AN4 320 in a control portion of the second time period, which may allow AN4 320 to receive the priority communication from AN2 310 in a data portion of the second time period.

AN4 320 may also schedule additional communications based at least in part on the second message. For example, AN4 320 may schedule transmission of the priority communication from AN4 320 to UE 325 during the third time period based at least in part on the second message. The second message may include configuration information for the additional communication based on information provided in the first message. In this regard, the second message may be transmitted from AN3 315 to a plurality of different network nodes, including AN2 310 or AN4 320.

After the priority communication is delivered, the ANs in the wireless communications system 300 may resume the previously-configured schedule.

Figure 4:
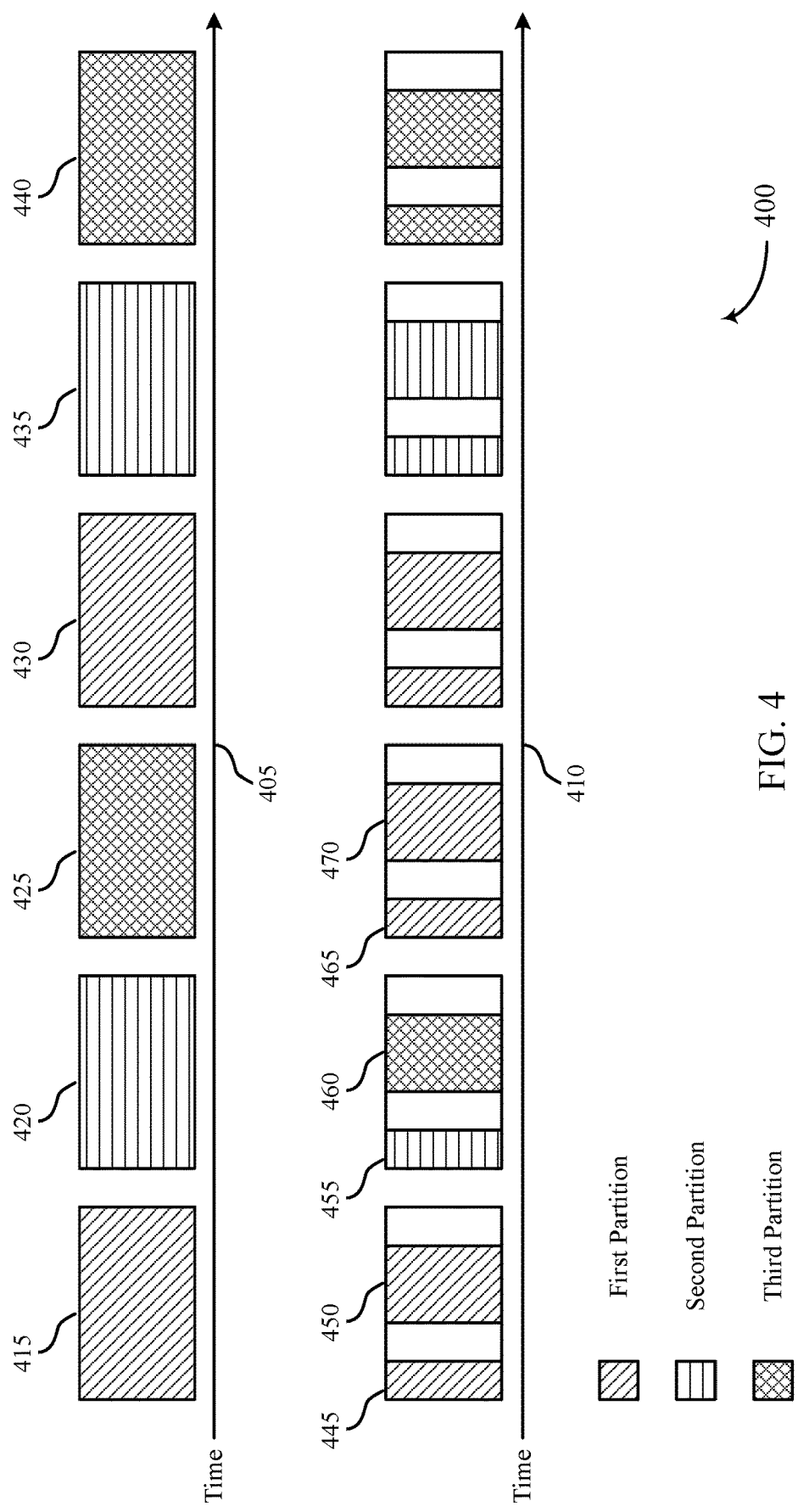
FIG. 4 illustrates an example of a schedule of transmissions in a wireless communications system in accordance with aspects of the present disclosure.

FIG. 4 illustrates an example of a schedule of transmissions 400 in a wireless communications system in accordance with various aspects of the present disclosure. In some examples, the wireless communications system may implement aspects of wireless communications systems 100, 200, or 300.

The schedule of transmissions shows a preconfigured schedule 405 and a modified schedule 410. The preconfigured schedule 405 and the modified schedule may be managed by a CAN such as CAN 330 as described with reference to FIG. 3. The preconfigured schedule 405 may provide for transmissions over communication links in the first partition during a first time period 415 and a fourth time period 430, transmissions over communication links in the second partition during a second time period 420 and a fifth time period 435, and transmissions over communication links in the third partition during a third time period 425 and a sixth time period 440.

The modified schedule 410 shows transmissions in a wireless communications system such as wireless communications system 300 according to the preconfigured schedule 405 as modified by the CAN. A priority communication (e.g., a URLLC) may be ready for transmission at AN1 305. The priority communication may be transmitted from AN1 305 to AN2 310 during the first time period 415 because the communication link 340 may be assigned to the first partition. Accordingly, AN1 305 may transmit downlink control information 445 during a control portion of the first time period 415, and may transmit the priority communication during a data portion 450 of the first time period 415.

The priority communication may not be transmitted from AN2 310 to AN4 320 during the second time period 420 according to the preconfigured schedule 405 because the communication link 355 may not be assigned to the second partition. However, the CAN 330 may modify the preconfigured schedule in order to allow this transmission. The CAN 330 may transmit a first message to AN3 315, which may include configuration information for transmission of the priority communication between AN2 310 and AN4 320.

AN3 315 may communicate with AN4 320 during the second time period 420 as the communication link 350 may be assigned to the second portion. Accordingly, AN3 315 may transmit a second message 455 to AN4 during the second time period 420. The second message 455 may be transmitted as downlink control information in a control portion of the second time period 420. The second message 455 may be generated based at least in part on the first message. The second message 455 may include configuration information for transmission of the priority communication from AN2 310 to AN4 320. The configuration information may include, for example, a modulation and coding scheme for the priority communication, a reference signal pattern for the priority communication, a number of transmission layers for the priority communication, HARQ-related information for the priority communication, a number of antenna ports for the priority communication, information about a choice of precoding for the priority communication, digital and/or analog beamforming information for the priority communication, QCL information for the priority communication, and a combination thereof.

The second message 455 may also provide configuration information for additional transmissions involving the priority communication (e.g., configuration information for transmission of the priority communication from AN4 320 to UE 325). The second message 455 may also provide information regarding how to modify the preconfigured schedule in a future time interval (e.g., the data portion of the second time period 420). In this regard, the second message may be transmitted from AN3 315 to a plurality of different network nodes, including AN2 310 or AN4 320.

Based on the configuration information, the priority communication may be transmitted from AN2 310 to AN4 320 during a data portion 460 of the second time period 420. In some examples, control information for the transmission from AN2 310 to AN4 320 may also be transmitted during the data portion 460 of the second time period 420.

In some examples, the preconfigured schedule 405 may not schedule AN4 320 to transmit the priority communication from AN4 320 to UE 325 during the third time period 425 (e.g., because the communication link 345 may not be assigned to the third partition). However, AN4 320 may transmit the priority communication to UE 325 during a data portion 470 of the third time period 425 according to information received within the second message 455. That is, the second message 455 may include information about a future action to be taken by a node after receiving the priority communication. For example, the second message 455 may include configuration information for forwarding the priority communication to the destination of the priority communication. Based on the configuration information, AN4 320 may transmit control information 465 to UE 325 during a control portion of the third time period 425, and may transmit the priority communication to UE 325 during a data portion 470 of the third time period.

The ANs in the wireless communications system may thereafter resume transmissions in accordance with the preconfigured schedule 405.

Figure 5:
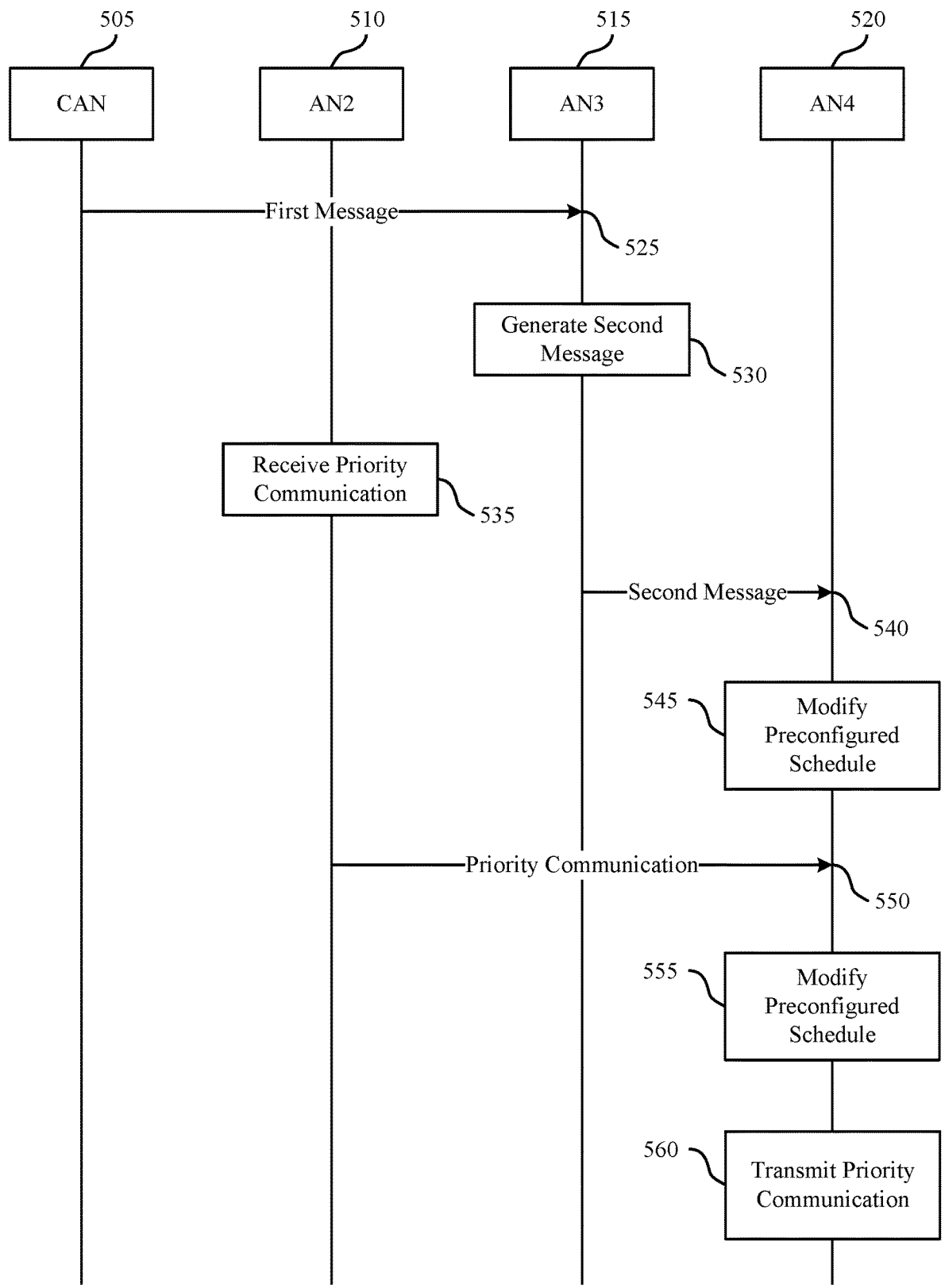
FIG. 5 illustrates an example of a communications flow in a wireless communications system in accordance with aspects of the present disclosure.

FIG. 5 illustrates an example of a communications flow 500 in a wireless communications system in accordance with various aspects of the present disclosure. In some examples, the wireless communications system may implement aspects of wireless communications systems 100, 200, 300, or 400.

The communications flow 500 illustrates communications between a CAN 505, a second AN AN2 510, a third AN AN3 515, and a fourth AN AN4 520. CAN 505 may be an example of aspects of CAN 330 described with reference to FIG. 3. AN2 510, AN3 515, and AN4 520 may be examples of aspects of AN2 310, AN3 315, and AN4 320, respectively, as described with reference to FIG. 3.

The CAN 505 may receive an indication that a priority communication has been introduced to the wireless communications system (e.g., at a first AN AN1 such as AN1 305 as described with reference to FIG. 3). The indication may be an indication that the priority communication may be in the system and may not include any configuration information for transmitting the priority communication through the wireless network, as this task may be handled by the CAN 505. In some examples, the CAN 505 may receive the indication directly or indirectly from AN1. In some other examples, the CAN 505 may have knowledge of the priority communication before it arrives at AN1, and may have provided the resources for another node in the network to transmit the priority communication to AN1. In this instance, no indication from AN1 to CAN 505 may be needed. The CAN 505 may transmit configuration information to AN1 so that AN1 may transmit the priority communication to another node in the network on an expedited schedule. The CAN 505 may also transmit a first message 525 to AN3 515. The first message 525 may relate to a transmission of the priority communication between two other nodes in the wireless communications system. For example, the first message 525 may relate to a transmission of the priority communication between AN2 510 and AN4 520.

The first message 525 may include information about a modification to a preconfigured schedule. In some cases, the modification may include re-scheduling a previously scheduled transmission or dropping a previously scheduled transmission. For example, the first message 525 may include configuration information for a transmission of the priority communication between AN2 510 and AN4 520. The configuration information may be, for example, a modulation and coding scheme for the priority communication, a reference signal pattern for the priority communication, a number of transmission layers for the priority communication, HARQ-related information for the priority communication, a number of antenna ports for the priority communication, information about a choice of precoding for the priority communication, digital and/or analog beamforming information for the priority communication, QCL information for the priority communication, and a combination thereof.

The first message 525 may also include configuration information for future communications involving the priority communication. In some examples, the first message 525 may include information about how to modify the preconfigured schedule (e.g., whether to drop or reschedule a preempted transmission).

AN3 515 may generate a second message based at least in part on the first message 525 at 530. The second message may include any of the information provided in the first message 525 by the CAN 505.

AN2 510 may receive the priority communication 535 from another node in the wireless communications system (e.g., AN1 305 as described with reference to FIG. 3). AN2 510 may receive the priority communication 535 during a first time period such as first time period 415 as described with reference to FIG. 4. However, AN2 510 may not, in accordance with a preconfigured schedule, be able to forward the priority communication 535 to AN4 520 in a second time period such as second time period 420 as described with reference to FIG. 4. However, AN3 515 may be able to communicate with AN4 520 according to the preconfigured schedule. AN3 515 may transmit a second message 540 to AN4 520. The AN3 515 may transmit the second message 540 over a control channel, a data channel, or a combination thereof. For example, AN3 515 may transmit the second message 540 in a control portion of the second time period as described with reference to FIG. 4.

AN4 520 may modify the preconfigured schedule based at least in part on the second message 540 at 545. The modified schedule may permit transmission of the priority communication from AN2 510 to AN4 520 in the second time period. AN2 510 may transmit the priority communication 550 to AN4 520 in a data portion of the second time period based at least in part on the modified schedule. The transmission may occur in accordance with the configuration information provided in the second message 540.

AN4 520 may modify the preconfigured schedule for other transmissions based at least in part on the second message 540 at 555. For example, AN4 may modify the preconfigured schedule to allow AN4 520 to transmit the priority configuration to a destination node such as UE 325 as described with reference to FIG. 3. AN4 520 may transmit the priority communication 560 to the destination node in accordance with the modified schedule. For example, AN4 520 may transmit the priority communication 560 to the destination node in a third time period such as third time period 425 as described with reference to FIG. 4.

The nodes, including CAN 505, AN2 510, AN3 515, and AN4 520, may continue transmitting in accordance with the preconfigured schedule after the priority communication 560 is delivered to the destination node.

Figure 6:
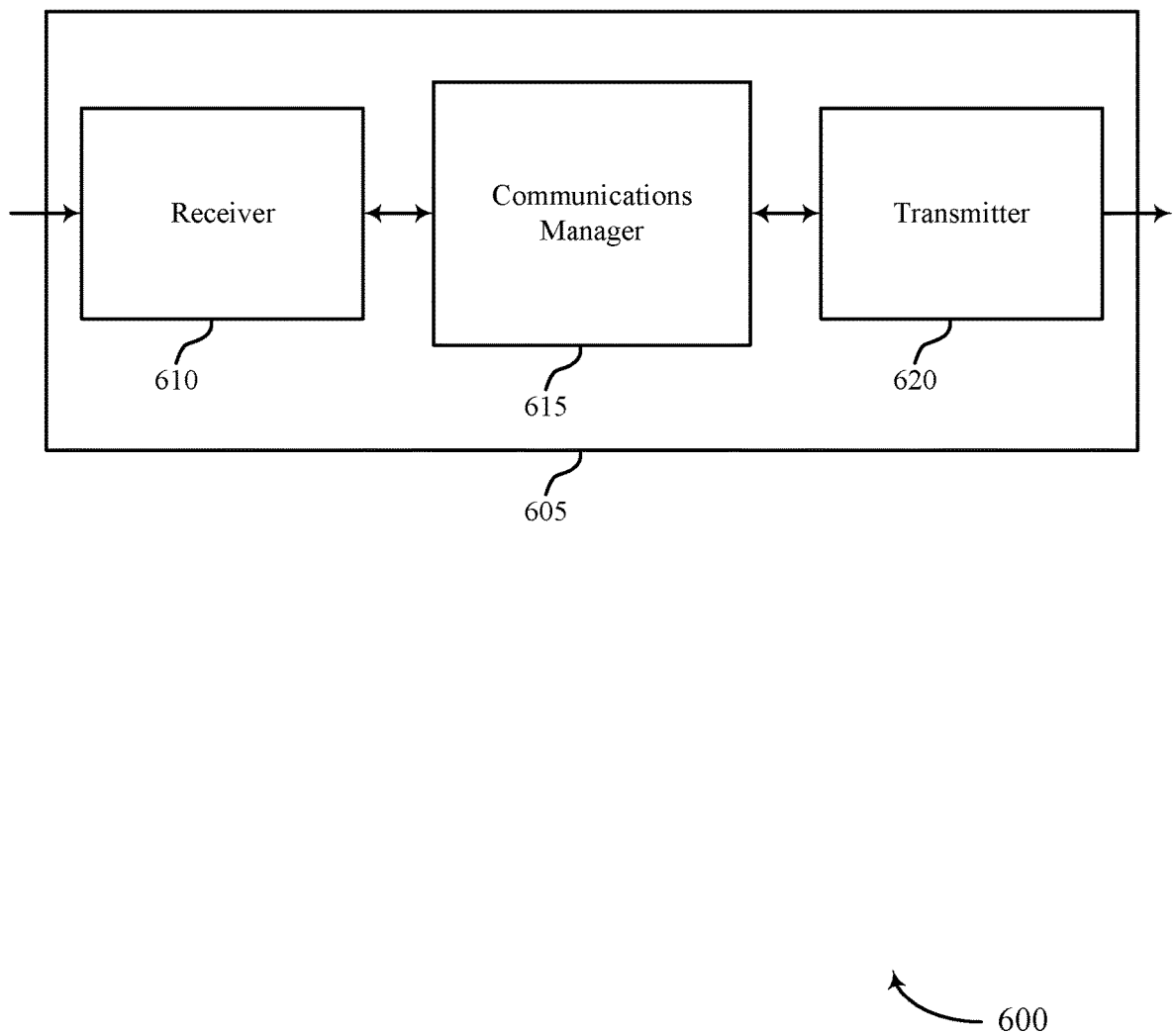
FIGS. 6 through 8 show block diagrams of a device in accordance with aspects of the present disclosure.

FIG. 6 shows a block diagram 600 of a wireless device 605 in accordance with aspects of the present disclosure. Wireless device 605 may include aspects of an AN such as AN3 315 as described with reference to FIG. 3. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to supporting low-latency traffic over a wireless mesh network, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may receive, at a wireless device in a wireless mesh network, a first message concerning a priority communication that is to be transmitted from a first network node to a second network node and transmit, based on receipt of the first message, a second message to the second network node, the second message including information to facilitate receipt of the priority communication by the second network node. The communications manager 615 may also receive, at a wireless device in a wireless mesh network, a first message concerning a priority communication that is to be transmitted from a first network node to a second network node and transmit, based on receipt of the first message, a second message to a third network node, the second message indicating that the third network node is to modify a preconfigured ongoing schedule of communications between neighboring network nodes as a result of the priority communication.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
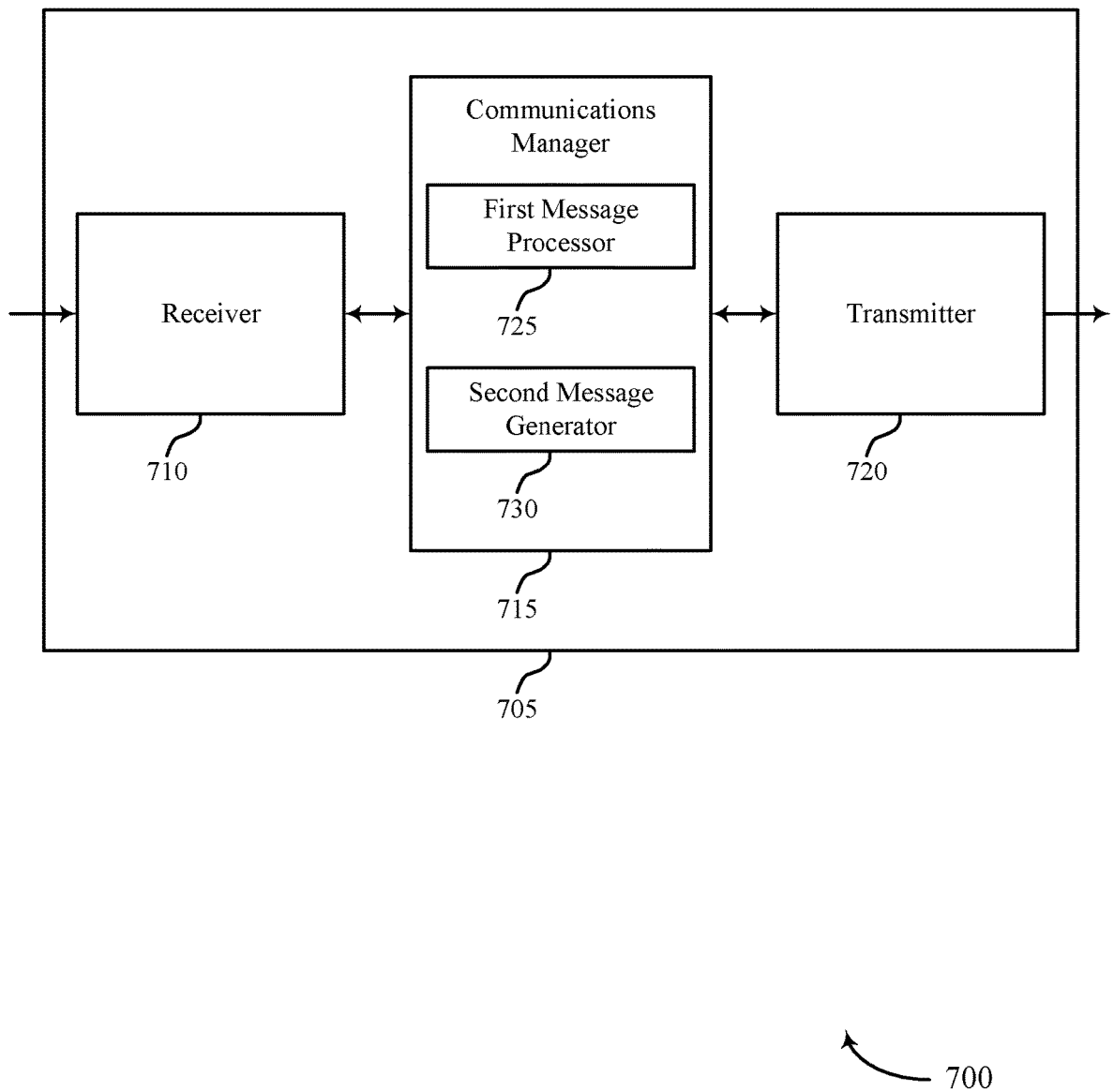

FIG. 7 shows a block diagram 700 of a wireless device 705 in accordance with aspects of the present disclosure. Wireless device 705 may include aspects of a wireless device 605 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to supporting low-latency traffic over a wireless mesh network, etc.). Information may be passed on to other components of the device. The receiver 710 may be an example of aspects of the transceiver 935 described with reference to FIG. 9. The receiver 710 may utilize a single antenna or a set of antennas. Communications manager 715 may be an example of aspects of the communications manager 915 described with reference to FIG. 9. Communications manager 715 may also include first message processor 725 and second message generator 730.

First message processor 725 may receive, at a wireless device in a wireless mesh network, a first message concerning a priority communication that is to be transmitted from a first network node to a second network node. In some cases, receiving the first message includes: receiving the first message from a central node which manages or schedules resources in the wireless mesh network. In some cases, the first message may be received from the central node over multiple hops. In some cases, the first message may be received directly from the central node. In some cases, the priority communication may be low latency traffic. In some cases, receiving the first message includes: receiving the first message from a central node which manages or schedules resources in the wireless mesh network. In some cases, the first message may be received from the central node over multiple hops. In some cases, the first message may be received directly from the central node.

Second message generator 730 may transmit, based on receipt of the first message, a second message to the second network node, the second message including information to facilitate receipt of the priority communication by the second network node. The second message generator 730 may also generate the second message to explicitly indicate to the second network node instructions to alter a scheduling of other communications affected by the priority communication. In some instances, the second message generator 730 may generate the second message to indicate that the priority communication is to be received by the second network node from the first network node during a transmission time interval reserved for communications between nodes other than the first network node and the second network node. The second message generator 730 may generate the second message to indicate at least one of resource information or configuration information to be used by the second network node in receipt of the priority communication.

The second message may be generated to indicate an action for the second network node to take after receipt of the priority communication. Further, the second message generator 730 may transmit, based on receipt of the first message, a second message to the third network node. In some cases, the second message may indicate that the third network node is to modify a preconfigured ongoing schedule of communications between neighboring network nodes as a result of the priority communication. The second message generator 730 may generate the second message to explicitly indicate modifications of the preconfigured ongoing schedule to be made by the third network node. In some examples, the third network node may be one of the first network node and the second network node.

In some cases, the modifications may include dropping a previously scheduled transmission. In some cases, the second message may include at least one of a modulation and coding scheme for the priority communication, a numerology for the priority communication, a reference signal pattern for the priority communication, a number of transmission layers for the priority communication, hybrid automatic repeat request-related information for the priority communication, a number of antenna ports for the priority communication, precoding information for the priority communication, beamforming information for the priority communication, or quasi-co-location information for the priority communication. In some cases, transmitting the second message may include transmitting the second message over a control channel, a data channel, or both. In some examples, the action may include forwarding data included in the priority communication to a third network node. In some cases, the second message includes an indication of at least one of resource information or configuration information for the forwarding of data included in the priority communication. In some aspects, the modifications include re-scheduling a previously scheduled transmission.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
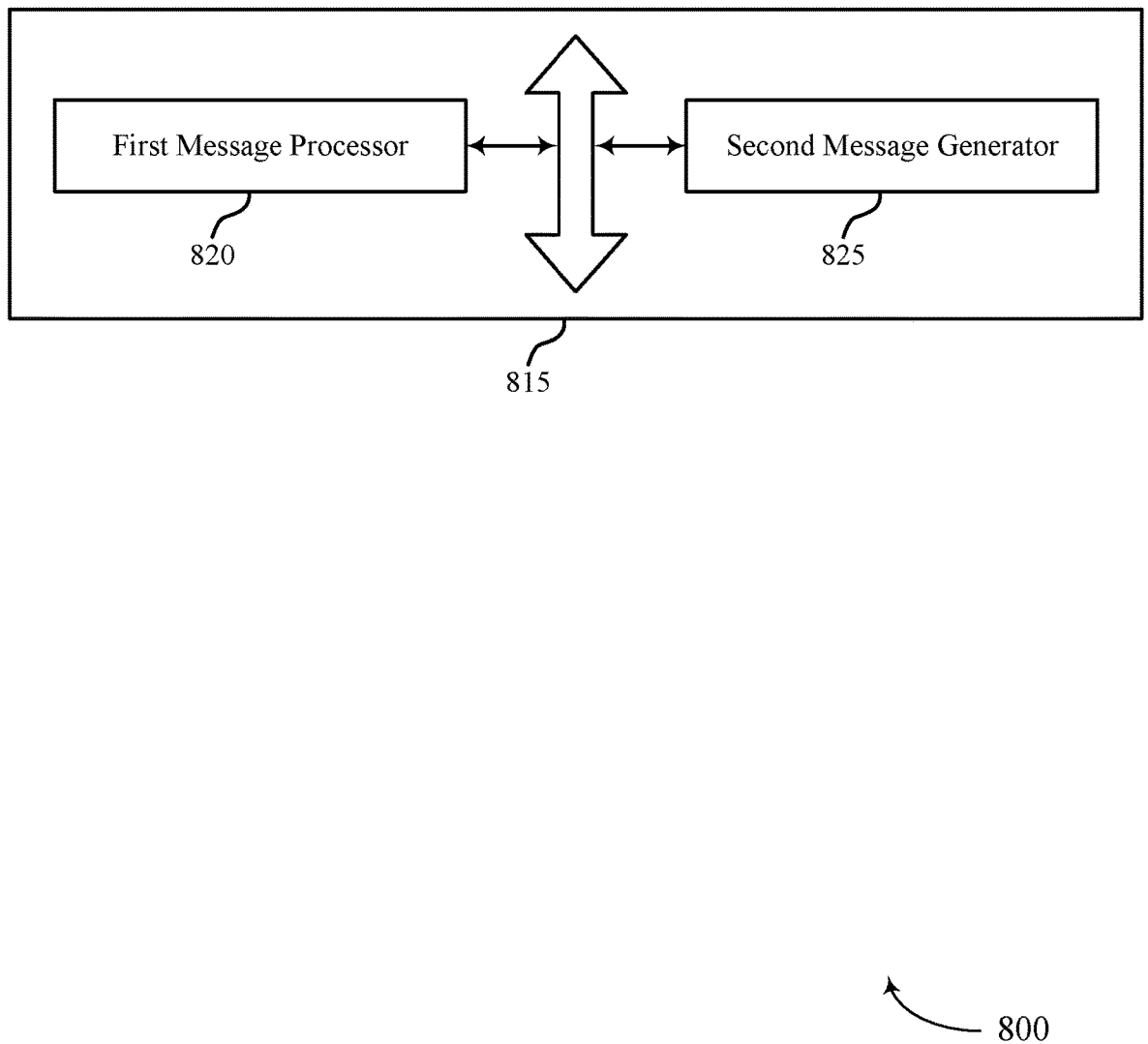

FIG. 8 shows a block diagram 800 of a communications manager 815 in accordance with aspects of the present disclosure. The communications manager 815 may include aspects of a communications manager 615, a communications manager 715, or a communications manager 915 described with reference to FIGS. 6, 7, and 9. The communications manager 815 may include first message processor 820 and second message generator 825. Each of these modules may communicate, directly or indirectly, with one another (e.g., via one or more buses).

First message processor 820 may receive, at a wireless device in a wireless mesh network, a first message concerning a priority communication that is to be transmitted from a first network node to a second network node. In some cases, receiving the first message includes: receiving the first message from a central node which manages or schedules resources in the wireless mesh network. In some examples, the first message may be received from the central node over multiple hops. In some instances, the first message may be received directly from the central node. In some aspects, the priority communication may be low latency traffic. In some cases, receiving the first message may include receiving the first message from a central node which manages or schedules resources in the wireless mesh network. In some cases, the first message may be received from the central node over multiple hops. In some cases, the first message may be received directly from the central node.

Second message generator 825 may transmit, based on receipt of the first message, a second message to the second network node, the second message including information to facilitate receipt of the priority communication by the second network node. The second message generator 825 may also generate the second message to explicitly indicate to the second network node instructions to alter a scheduling of other communications affected by the priority communication. The second message generator 825 may also generate the second message to indicate that the priority communication is to be received by the second network node from the first network node during a transmission time interval reserved for communications between nodes other than the first network node and the second network node. In some instances, the second message generator 825 may generate the second message to indicate at least one of resource information or configuration information to be used by the second network node in receipt of the priority communication.

The second message may be generated to indicate an action for the second network node to take after receipt of the priority communication. Additionally, the second message generator 825 may transmit, based on receipt of the first message, a second message to the third network node. The second message may indicate that the third network node is to modify a preconfigured ongoing schedule of communications between neighboring network nodes as a result of the priority communication. The second message generator 825 may generate the second message to explicitly indicate modifications of the preconfigured ongoing schedule to be made by the third network node. In some examples, the third network node may be one of the first network node and the second network node.

In some cases, the modifications include dropping a previously scheduled transmission. In some instances, the second message may include at least one of a modulation and coding scheme for the priority communication, a numerology for the priority communication, a reference signal pattern for the priority communication, a number of transmission layers for the priority communication, hybrid automatic repeat request-related information for the priority communication, a number of antenna ports for the priority communication, precoding information for the priority communication, beamforming information for the priority communication, or quasi-co-location information for the priority communication. In some cases, transmitting the second message may include transmitting the second message over a control channel, a data channel, or both. In some examples, the action may include forwarding data included in the priority communication to a third network node. In some instances, the second message may include an indication of at least one of resource information or configuration information for the forwarding of data included in the priority communication. In some cases, the modifications may include re-scheduling a previously scheduled transmission.

Figure 9:
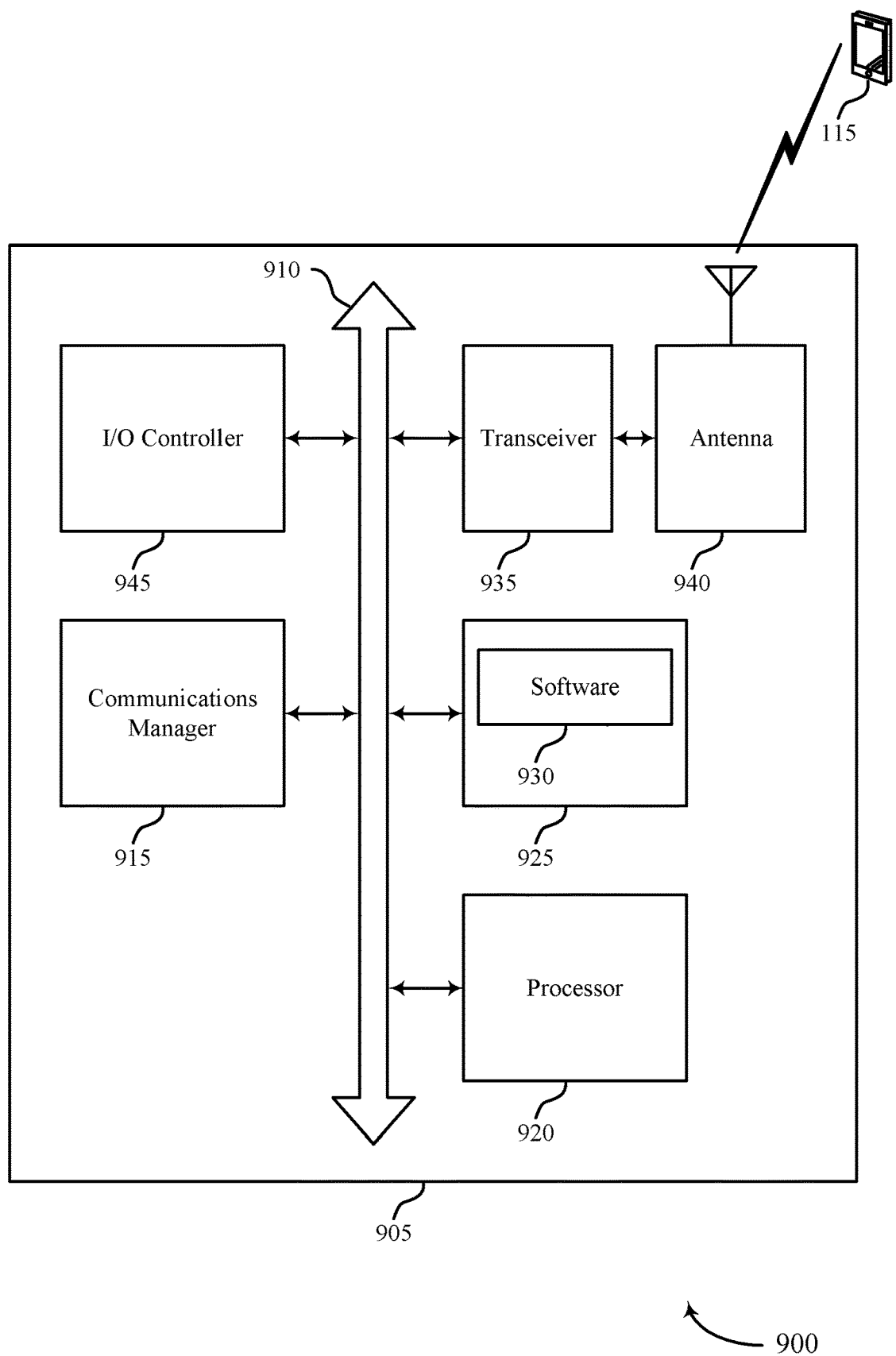
FIG. 9 illustrates a block diagram of a system including a wireless device in accordance with aspects of the present disclosure.

FIG. 9 shows a diagram of a system 900 including a device 905 in accordance with aspects of the present disclosure. Device 905 may be an example of or include the components of wireless device 605 or a wireless device 705 as described above (e.g., with reference to FIGS. 6 and 7). Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting low-latency traffic over a wireless mesh network).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support low-latency traffic over a wireless mesh network. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
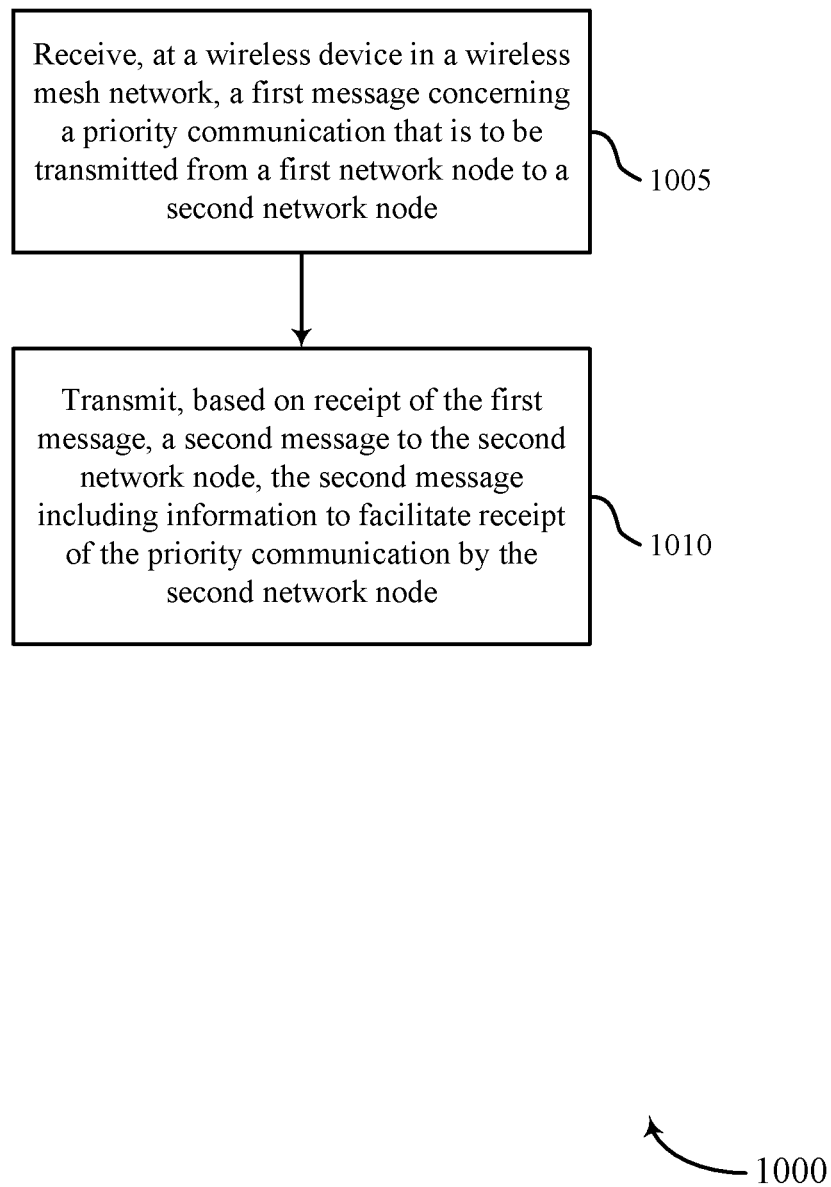
FIGS. 10 through 11 illustrate methods in accordance with aspects of the present disclosure.

FIG. 10 shows a flowchart illustrating a method 1000 in accordance with aspects of the present disclosure. The operations of method 1000 may be implemented by a wireless device such as AN AN3 315 as described with reference to FIG. 3, or its components as described herein. For example, the operations of method 1000 may be performed by a communications manager as described with reference to FIGS. 6 through 9. In some examples, a wireless device may execute a set of codes to control the functional elements of the device to perform the functions described below. Additionally or alternatively, the wireless device may perform aspects of the functions described below using special-purpose hardware.

At block 1005 the wireless device may receive, at a wireless device in a wireless mesh network, a first message concerning a priority communication that is to be transmitted from a first network node to a second network node. The operations of block 1005 may be performed according to the methods described herein. In certain examples, aspects of the operations of block 1005 may be performed by a first message processor as described with reference to FIGS. 6 through 9.

At block 1010 the wireless device may transmit, based at least in part on receipt of the first message, a second message to the second network node, the second message including information to facilitate receipt of the priority communication by the second network node. The operations of block 1010 may be performed according to the methods described herein. In certain examples, aspects of the operations of block 1010 may be performed by a second message generator as described with reference to FIGS. 6 through 9.

Figure 11:
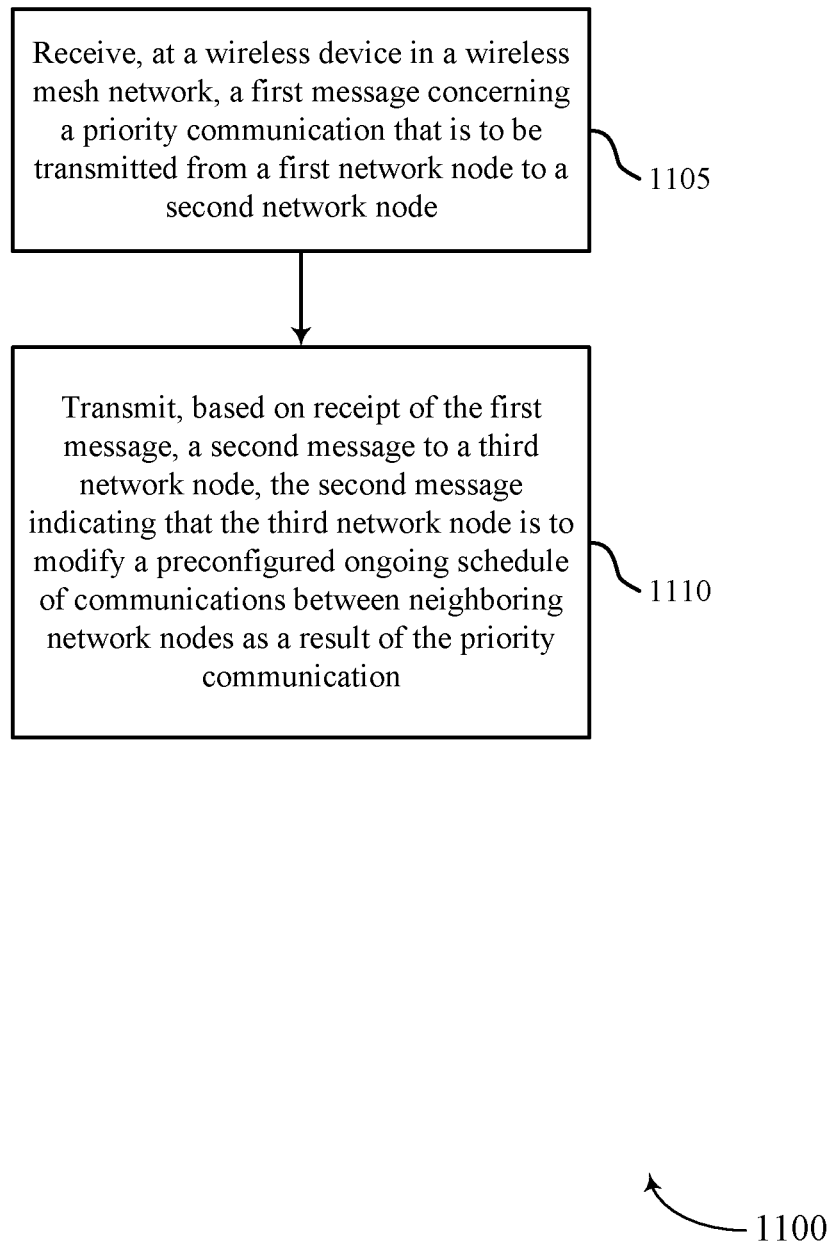

FIG. 11 shows a flowchart illustrating a method 1100 in accordance with aspects of the present disclosure. The operations of method 1100 may be implemented by a wireless device such as AN3 315 as described with reference to FIG. 3, or its components as described herein. For example, the operations of method 1100 may be performed by a communications manager as described with reference to FIGS. 6 through 9. In some examples, a wireless device may execute a set of codes to control the functional elements of the device to perform the functions described below. Additionally or alternatively, the wireless device may perform aspects of the functions described below using special-purpose hardware.

At block 1105 the wireless device may receive, at a wireless device in a wireless mesh network, a first message concerning a priority communication that is to be transmitted from a first network node to a second network node. The operations of block 1105 may be performed according to the methods described herein. In certain examples, aspects of the operations of block 1105 may be performed by a first message processor as described with reference to FIGS. 6 through 9.

At block 1110 the wireless device may transmit, based at least in part on receipt of the first message, a second message to a third network node, the second message indicating that the third network node is to modify a preconfigured ongoing schedule of communications between neighboring network nodes as a result of the priority communication. The operations of block 1110 may be performed according to the methods described herein. In certain examples, aspects of the operations of block 1110 may be performed by a second message generator as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a wireless device in a wireless mesh network, a first message concerning a priority communication that is to be transmitted from a first network node to a second network node, wherein the wireless device is different from the first network node and the second network node; and
   transmitting, based at least in part on receipt of the first message, a second message to the second network node, the second message including information to facilitate receipt of the priority communication by the second network node.

2. The method of claim 1, further comprising:
   generating the second message to indicate that the priority communication is to be received by the second network node from the first network node during a transmission time interval reserved for communications between nodes other than the first network node and the second network node.

3. The method of claim 1, further comprising:
   generating the second message to explicitly indicate to the second network node instructions to alter a scheduling of other communications affected by the priority communication.

4. The method of claim 1, wherein receiving the first message comprises:
   receiving the first message from a central node which manages or schedules resources in the wireless mesh network.

5. The method of claim 4, wherein the first message is received from the central node over multiple hops.

6. The method of claim 4, wherein the first message is received directly from the central node.

7. The method of claim 1, wherein the priority communication is low latency traffic.

8. The method of claim 1, further comprising:
generating the second message to indicate at least one of resource information or configuration information to be used by the second network node in receipt of the priority communication.

9. The method of claim 8, wherein the second message comprises at least one of a modulation and coding scheme for the priority communication, a numerology for the priority communication, a reference signal pattern for the priority communication, a number of transmission layers for the priority communication, hybrid automatic repeat request-related information for the priority communication, a number of antenna ports for the priority communication, precoding information for the priority communication, beamforming information for the priority communication, or quasi-co-location information for the priority communication.

10. The method of claim 1, wherein transmitting the second message comprises:
transmitting the second message over a control channel, a data channel, or both.

11. The method of claim 1, further comprising:
generating the second message to indicate an action for the second network node to take after receipt of the priority communication.

12. The method of claim 11, wherein the action comprises forwarding data included in the priority communication to a third network node.

13. The method of claim 12, wherein the second message comprises an indication of at least one of resource information or configuration information for the forwarding of data included in the priority communication.

14. A method for wireless communication, comprising:
receiving, at a wireless device in a wireless mesh network, a first message concerning a priority communication that is to be transmitted from a first network node to a second network node, wherein the wireless device is different from the first network node and the second network node; and
transmitting, based at least in part on receipt of the first message, a second message to a third network node, the second message indicating that the third network node is to modify a preconfigured ongoing schedule of communications between neighboring network nodes as a result of the priority communication.

15. The method of claim 14, further comprising:
generating the second message to explicitly indicate modifications of the preconfigured ongoing schedule to be made by the third network node.

16. The method of claim 15, wherein the modifications include re-scheduling a previously scheduled transmission.

17. The method of claim 15, wherein the modifications include dropping a previously scheduled transmission.

18. The method of claim 14, wherein receiving the first message comprises:
receiving the first message from a central node which manages or schedules resources in the wireless mesh network.

19. The method of claim 18, wherein the first message is received from the central node over multiple hops.

20. The method of claim 18, wherein the first message is received directly from the central node.

21. The method of claim 14, wherein the third network node is one of the first network node and the second network node.

22. The method of claim 14, further comprising:
resuming the preconfigured ongoing schedule of communications between neighboring network nodes after the priority communication is transmitted from the first network node to the second network node.

23. An apparatus for wireless communication, comprising:
a processor;
memory in electronic communication with the processor; and
instructions stored in the memory and operable, when executed by the processor, to cause the apparatus to:
receive, at a wireless device in a wireless mesh network, a first message concerning a priority communication that is to be transmitted from a first network node to a second network node, wherein the wireless device is different from the first network node and the second network node; and
transmit, based at least in part on receipt of the first message, a second message to the second network node, the second message including information to facilitate receipt of the priority communication by the second network node.

24. The apparatus of claim 23, wherein the instructions are further executable by the processor to:
generate the second message to indicate that the priority communication is to be received by the second network node from the first network node during a transmission time interval reserved for communications between nodes other than the first network node and the second network node.

25. The apparatus of claim 23, wherein the instructions are further executable by the processor to:
generate the second message to explicitly indicate to the second network node instructions to alter a scheduling of other communications affected by the priority communication.

26. The apparatus of claim 23, wherein the instructions executable by the processor to receive the first message further comprise instructions executable by the processor to:
receive the first message from a central node which manages or schedules resources in the wireless mesh network.

27. The apparatus of claim 23, wherein the instructions are further executable by the processor to:
generate the second message to indicate at least one of resource information or configuration information to be used by the second network node in receipt of the priority communication.

28. An apparatus for wireless communication, comprising:
a processor;
memory in electronic communication with the processor; and
instructions stored in the memory and operable, when executed by the processor, to cause the apparatus to:
receive, at a wireless device in a wireless mesh network, a first message concerning a priority communication that is to be transmitted from a first network node to a second network node, wherein the wireless device is different from the first network node and the second network node; and
transmit, based at least in part on receipt of the first message, a second message to a third network node, the second message indicating that the third network node is to modify a preconfigured ongoing schedule of communications between neighboring network nodes as a result of the priority communication.

29. The apparatus of claim 28, wherein the instructions are further executable by the processor to:
generate the second message to explicitly indicate modifications of the preconfigured ongoing schedule to be made by the third network node.

30. The apparatus of claim 29, wherein the modifications include re-scheduling a previously scheduled transmission or dropping a previously scheduled transmission.

* * * * *